United States Patent [19]

Rumiesz, Jr. et al.

[11] Patent Number: 5,547,743
[45] Date of Patent: Aug. 20, 1996

[54] THIN HIGH DENSITY GLASS FIBER PANEL

[76] Inventors: Joseph Rumiesz, Jr., 16625 E. Dorado Ave., Aurora, Colo. 80015; Dixon R. Walker, 10 Mourning Dove La., Littleton, Colo. 80127; Ralph M. Fay, 2249 S. Hoyt Ct., Lakewood, Colo. 80227

[21] Appl. No.: 287,559

[22] Filed: Aug. 9, 1994

Related U.S. Application Data

[63] Continuation-in-part of Ser. No. 153,330, Nov. 16, 1993, abandoned.

[51] Int. Cl.$^6$ ...................................................... D03D 3/00
[52] U.S. Cl. .......................... 428/224; 428/282; 428/285; 428/296; 428/297; 428/298; 428/301; 428/302; 52/267; 52/281; 181/286; 181/287; 181/290; 181/294
[58] Field of Search ...................... 428/224, 285, 428/296, 297, 282, 301, 302; 52/267, 268, 269, 281; 156/60, 182, 272.2, 299; 181/286, 287, 290, 294

[56] References Cited

U.S. PATENT DOCUMENTS

| | | | |
|---|---|---|---|
| 2,612,462 | 11/1947 | Zettel | 154/28 |
| 3,620,906 | 11/1971 | Hannes | 161/203 |
| 3,718,536 | 2/1973 | Downs et al. . | |
| 3,909,484 | 9/1975 | Beavon | 260/40 R |
| 4,112,174 | 9/1978 | Hannes et al. | 428/220 |
| 4,195,110 | 3/1980 | Dierks et al. . | |
| 4,265,979 | 5/1981 | Baehr et al. . | |
| 4,364,212 | 12/1982 | Pearson et al. . | |
| 4,378,405 | 3/1983 | Pilgrim . | |
| 4,504,533 | 3/1985 | Altenhofer et al. . | |
| 4,564,544 | 1/1986 | Burkard . | |
| 4,664,707 | 5/1987 | Wilson et al. . | |
| 4,746,560 | 5/1988 | Goeden | 428/151 |
| 4,810,569 | 3/1989 | Lehnert et al. | 428/285 |
| 4,835,045 | 5/1989 | Kielmeyer et al. | 428/284 |
| 5,041,178 | 8/1991 | Kielmeyer et al. | 156/62.4 |
| 5,148,645 | 9/1992 | Lehnert et al. . | |
| 5,149,920 | 9/1992 | Meeker et al. | 181/290 |

*Primary Examiner*—Patrick Ryan
*Assistant Examiner*—Merrick Dixon
*Attorney, Agent, or Firm*—Cornelius P. Quinn

[57] ABSTRACT

A glass fiber structural panel has one or more planar, thin, high density, glass fiber mat laminates. Each glass fiber mat laminate has layers of glass fiber mat and intermediate layers of pliable, thermoplastic adhesive adhesively bonding the layers of glass fiber mat together to form the planar, thin, high density, glass fiber mat laminate which, after being folded through 180°, will return to a planar condition without wrinkles or creases in the major surfaces of the laminate. Bower density glass fiber backing or core layers can be adhesively bonded to the planar, thin, high density, glass fiber mat laminates to inexpensively increase the thickness and sound absorbing properties of the structural panel.

10 Claims, 1 Drawing Sheet

THIN HIGH DENSITY GLASS FIBER PANEL

This patent application is a continuation-in-part of U.S. patent application Ser. No. 08/153,330; filed Nov. 16, 1993 and abandoned; Joseph Rumiesz, Jr., et al; entitled "THIN HIGH DENSITY FIBER GLASS PANEL".

BACKGROUND OF THE INVENTION

The present invention relates to thin, high density, glass fiber panels and, more specifically, to thin, high density, white or pale colored, glass fiber panels which are rigid enough to serve as structural members and useful as a backing for fabric covered office partitions and the like.

High density molded glass fiber boards having densities between seven and sixteen pounds per cubic foot and thicknesses between 1/8 and 3/16 of an inch are currently used as structural backings for fabric covered office partitions, wall coverings and the like. These high density, molded glass fiber boards are yellow in color and require relatively expensive, opaque facings to hide the yellow color of the boards and to provide the boards with a consistent uniform substantially white color for the end users who fabricate the boards into partitions, wall coverings and similar products. With their relatively expensive, opaque facings and fabric coverings, these molded board products present a pleasing, decorative appearance and serve to enhance the appearance of an office whether used in an office partition or as a wall covering to cover older plaster walls and the like.

In addition to the need to hide the yellow color of the molded boards with a relatively expensive, opaque facing, the use of such boards has presented another problem. Due to their high density, these boards are brittle and break in two when folded. Furthermore, while these boards are only about 1/8 to about 3/16 of an inch thick, these boards are typically four feet wide by eight to ten feet long. Accordingly, if these boards are not handled carefully, the narrow thickness of these boards combined with their large overall dimensions and brittle nature, make these molded boards susceptible to damage or breakage during shipment, handling and/or installation.

SUMMARY OF THE INVENTION

The present invention is directed to a glass fiber structural panel which can be used as an office partition, a wall covering or in other related applications. In one embodiment, the structural panel comprises alternate layers of glass fiber mat and a thermally activated, pliable thermoplastic adhesive which bonds the layers of glass fiber mat together to form a thin, high density glass fiber mat laminate. The mats used in the laminate are preferably white or pale colored so that the glass fiber mat laminate has an aesthetically pleasing appearance. In a second embodiment of the glass fiber structural panel, a low density glass fiber board, having a density of about two to about six pounds per cubic foot, is adhesively bonded to one surface of the thin, high density, glass fiber laminate as a backing. In a third embodiment of the glass fiber structural panel, a low density glass fiber board, having a density of about two to about six pounds per cubic foot is interposed between and adhesively bonded too two thin, high density, glass fiber mat laminates as a core.

Unlike the seven to sixteen pound per cubic foot, high density, molded glass fiber boards of the prior art which are quite brittle and easily damaged during shipping, handling and/or installation, the glass fiber structural panel of the present invention can be folded back upon itself and, when released, the panel will return to its original form. The thin, high density, glass fiber mat laminate of the structural panel may become weakened at the location where the laminate has been folded, but the thin, high density, glass fiber mat laminate of the present invention does not break in two and the surface of the thin, high density, glass fiber mat laminate retains its original smooth planar condition neither creasing or wrinkling.

The use of a low density two to six pound per cubic foot glass fiber board in the structural panel as a backing for or a core for the thin, high density, glass fiber mat laminate(s) provides an inexpensive way to increase the thickness of the structural panel when required and also provides the structural panel with good sound absorption properties. Since the thin, high density, glass fiber mat laminate or laminates still form the exposed surfaces of the structural panels, the structural panels will retain their smooth, planar appearance even when the structural panels have been subjected to bending or folding.

The glass fiber mat layers of the thin, high density, glass fiber mat laminate of the present invention are adhesively bonded together by the pliable, thermoplastic adhesive, but the glass fiber mats of the laminate are not impregnated with the adhesive or cohesively bonded together. If the glass mat layers of the laminate were impregnated with an adhesive and cohesively bonded together, the laminate would have substantially the same strength throughout its entire thickness and portions of the glass fiber mat layers could not be readily stripped off the laminate when desired. By adhesively bonding the glass fiber mat layers together rather than impregnating and cohesively bonding the glass fiber mat layers together, the thin, high density, glass mat laminate of the present invention has planes of relative weakness which are typically at the interfaces between the adhesive layers and the glass mat layers of the laminate. Thus, glass fiber mat layers or portions of such layers of the thin, high density, glass fiber mat laminate can be readily separated from the laminate at an adhesive layer interface with one of the glass fiber mat layers and edge portions of one or more of the outer glass fiber mat layers of a thin, high density, glass fiber mat laminate can be removed by simply cutting through one or more of the outer glass fiber mat and adhesive layers and stripping the unwanted edge portion(s) of the outer glass fiber mat layer or layers away from the remainder of the thin, high density, glass fiber mat laminate. This permits the glass fiber structural panels of the present invention to be readily modified to provide thin edge portions to be received in partition channel members and the like.

By choosing white or pale colored glass fiber mats for the thin, high density, glass fiber mat laminates of the present invention and by adhesively bonding the glass fiber mat layers of the laminates together with a pliable, thermoplastic adhesive that is activated below the temperature at which the binder in the white or pale colored glass fiber mats will discolor, the glass fiber structural panels of the present invention exhibit the white or pale coloration desired by the partition and wall covering fabricators. The glass fiber structural panels of the present invention also exhibit superior tack holding properties which are comparable to the tack holding properties of the brittle, high density, molded glass fiber panels of the prior art.

Thus, the present invention provides a glass fiber structural panel which can be used as an office partition or a wall covering. The edges of the structural panel can be readily modified to fit into partition support channels and the like. Unlike the high density, molded glass fiber panels of the prior art, the structural panels of the present invention are not brittle or easily damaged. The structural panels of the present invention have superior span strengths when compared to the high density, molded glass fiber boards of the prior art. In addition, the use of low density glass fiber boards as backings or cores in certain embodiments of the glass fiber structural panels of the present invention, provides an economical method of increasing the thicknesses of the glass fiber structural panels and increasing the sound absorptions properties of the glass fiber structural panels.

DETAILED DESCRIPTION OF THE PREFERRED EMBODIMENTS

Figure 1:
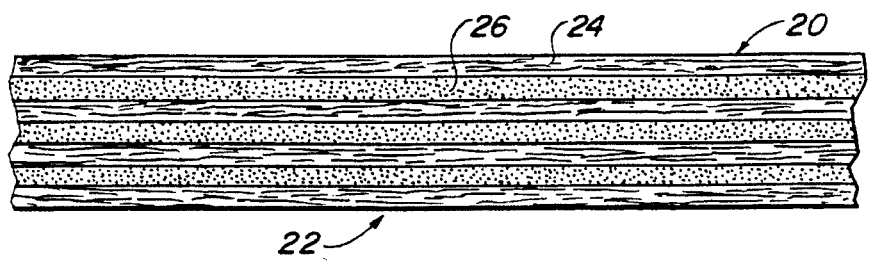
FIG. 1 is a cross sectional view of one embodiment of the glass fiber structural panel of the present invention which comprises a thin, high density, glass fiber mat laminate.

As shown in FIG. 1, one embodiment of the glass fiber structural panel 20 of the present invention comprises a glass fiber mat laminate 22 having alternate layers of glass fiber mat 24, such as a glass fiber roofing mat, and a pliable, thermoplastic adhesive 26. A typical white or pale colored glass fiber mat which can be used as the glass fiber mat 24 is a Schuller International, Inc., DURA-GLAS 7502 roofing mat. This mat has a weight of 2 pounds per one hundred square feet of mat (2 pounds per square) and is between twenty-eight and forty mils thick. Other white or pale colored glass fiber mats having weights ranging from about 1.4 to about 2.8 pounds per hundred square feet of mat (about 1.4 to about 2.8 pounds per square) and comprising randomly oriented glass fibers with average fiber diameters between about 1 and 16 microns can also be used as the glass fiber mats 24. As with the DURA-GLAS 7502 roofing mat, the randomly oriented glass fibers of these mats are bonded together at their points of intersection by resinous binders. Since glass fiber mats made of larger diameter fibers are less expensive, the glass fiber mats 24 of the laminate 22 of the present invention are typically made of fibers having average fiber diameters between 13 and 16 microns. However, where the expense can be justified, glass fiber mats made of smaller diameter fibers having average fiber diameters of about 1 to 13 microns are used to provide the structural panel 20 with a brighter, smoother, whiter surface than the structural panels made with glass fiber mats using the larger diameter glass fibers. A Schuller International Inc., DURA-GLAS 7917 roofing mat is an example of a higher quality glass fiber mat made of a blend of smaller diameter fibers and larger diameter fibers that can be used in the thin, high density, glass fiber mat laminate 22 of the present invention.

As shown in FIG. 1, the glass fiber mats 24 in the thin, high density glass fiber mat laminates 22 are adhesively bonded together with a low melt, pliable, thermoplastic adhesive layers 26. Preferably, the low melt thermoplastic adhesive used is a low melt, thermoplastic film which is pliable at temperatures of about 50° Fahrenheit and above. Dow Chemical Corporation's, 899 polyethylene film with a melt temperature of 250° Fahrenheit, in thicknesses of 1 mil or greater, is an acceptable pliable, thermoplastic adhesive for use in the thin, high density glass fiber mat laminate 22 of the present invention.

Figure 4:
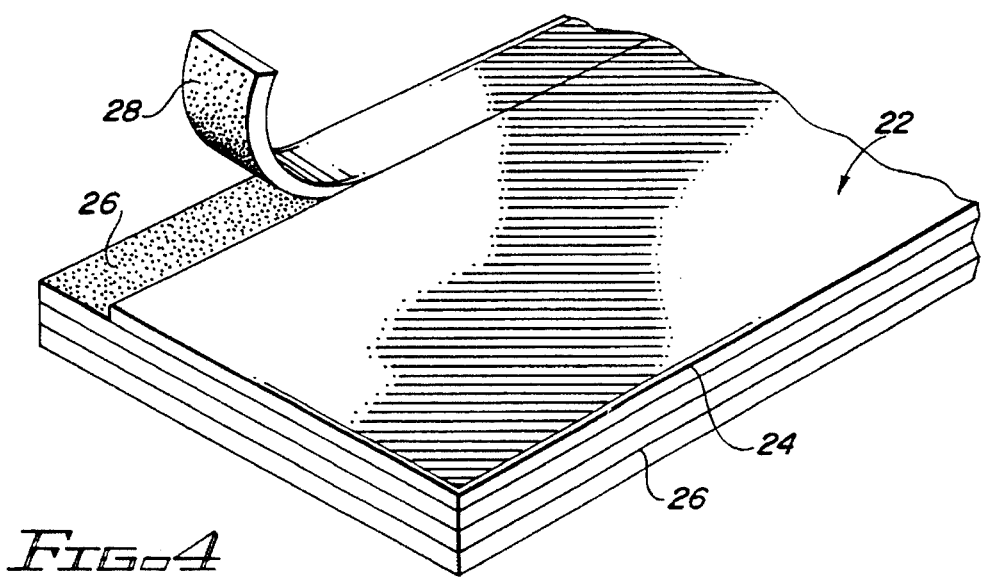
FIG. 4 is a partial perspective view of the glass fiber structural panel of FIG. 1 with the uppermost glass fiber mat of the thin, high density glass fiber mat laminate partially stripped away along one edge of the structural panel.

The pliable, thermoplastic adhesive layers 26 adhesively bond the glass fiber mats 24 together in the thin, high density glass fiber mat laminates 22. While the pliable, thermoplastic adhesive penetrates the glass fiber interstices of the glass fiber mats 24 sufficiently to adhesively bond the glass fiber mats 24 together, the glass fiber mats 24 are not impregnated or saturated with the thermoplastic adhesive and planes of relative weakness are formed in the thin, high density glass fiber mat laminate 22, typically at the interfaces between the pliable, thermoplastic adhesive layers 26 and the glass fiber mats 24. If one or more glass fiber mats 24 or portions of such mats are separated from the thin, high density, glass fiber mat laminate 22, the separation occurs at one of the planes of relative weakness within the laminate 22. Thus, the adhesive bonding of the glass fiber mats 24 by the pliable, thermoplastic adhesive layers 26 allows the glass fiber mats 24 of the thin, high density, glass fiber mat laminate 22 to be separated from each other if desired. By cutting through one or more glass fiber mats 24 of a thin, high density glass fiber mat laminate 22, a portion of the laminate 22 such as an edge portion 28 can be stripped away as shown in FIG. 4. This enables the edge portions of glass fiber structural panels 20, made of the thin, high density glass fiber mat laminates 22, to be made thinner than the remainder of the glass fiber structural panels so that the edge portions of the structural panels 20 can be inserted into partition support channels and the like.

The thin, high density, glass fiber mat laminate 22 has a thickness of about 1/16 to about 3/16 of an inch. The glass fiber structural panels 20 made from the thin, high density glass fiber mat laminates 22 have planar, major surfaces which are typically about four feet wide by eight to ten feet long. The thin, high density, glass fiber mat laminate 22 can be flexed or folded back upon itself (folded between 90° and 180°) and will return to its original shape without marring the smooth, planar surface of the thin, high density, glass fiber mat laminate 22 or a glass fiber structural panel 20 made from the laminate 22.

The thin, high density, glass fiber mat laminate 22 preferably has a modulus of elasticity equal to or greater than 60,000 psi and, as discussed above, will return to its original planar shape, without surf-ace creases or wrinkles, after being folded back upon itself through 180°. A 1/8 inch thick high density, glass fiber mat laminate of the present invention was compared with two different 1/8 inch thick, ten pound per cubic foot, molded glass fiber panels of the prior art. The modulus of elasticity of the 1/8 inch thick, high density, glass fiber mat laminate of the present invention measured 72,780 pounds per square inch (psi) with a standard deviation of 5582 psi. The modulus of elasticity of the two different 1/8 inch thick, ten pound per cubic foot, molded glass fiber panels of the prior art measured 54,470 psi with a standard deviation of 22,970 psi and 45,310 psi with a standard deviation of 12,390 psi, respectively. When tested to failure, the 1/8 inch thick, high density, glass fiber mat laminate of the present invention still returned to its original planar configuration and exhibited no surface creases or wrinkles. When tested to failure, the two 1/8 inch thick, ten pound per cubic foot, molded glass fiber panels of the prior art each broke into two pieces. In addition, the lower standard deviation exhibited by the ⅛ inch thick, high density, glass fiber mat laminate of the present invention, when compared to the two molded glass fiber panels of the prior art, demonstrates that the thin, high density, glass fiber mat laminate of the present invention is more consistent in its performance than the two molded glass fiber panels of the prior art.

The thin, high density, glass fiber mat laminate 22 of the present invention is manufactured by laying down alternate layers of the glass fiber mat 24 and the thermoplastic adhesive 26, preferably in film form. The number of layers of glass fiber mat and thermoplastic adhesive will depend on the desired thickness of the structural glass fiber panel 20 to be made from the thin, high density, glass fiber mat laminate 22. The thin, high density glass fiber mat laminate 22 is then formed under heat and pressure to adhesively bond the glass fiber mats 24 together with the thermoplastic adhesive. The amount of pressure applied to form the thin, high density glass fiber mat laminate 22 will vary with the density and the thickness required. The temperature applied will be sufficient to activate the thermoplastic adhesive, but below 400° Fahrenheit which is the temperature at which the binder in the glass fiber mats 24 will begin to discolor and undergo a slight thermal decomposition.

Figure 2:
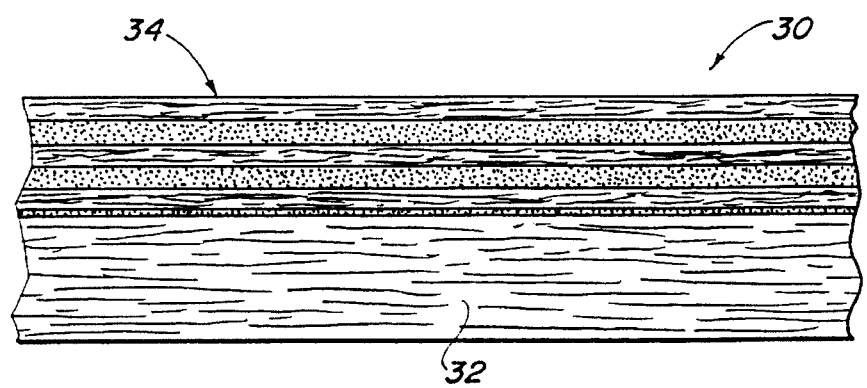
FIG. 2 is a cross sectional view of a second embodiment of the glass fiber structural panel of the present invention which comprises a thin, high density, glass fiber mat laminate with a low density backing layer.

FIG. 2 shows a second embodiment of the glass fiber structural panel of the present invention. The glass fiber structural panel 30 comprises a thin, high density, glass fiber mat laminate 34 and a low density, glass fiber board backing 32 adhesively bonded to one major surface of the thin, high density, glass fiber mat laminate 34. The thin, high density, glass fiber mat laminate 34 has the same structure and is formed in the same way as the thin, high density, glass fiber mat laminate 22 of FIG. 1. The low density, glass fiber board backing 32 is made of randomly oriented glass fibers which are bonded together at their points of intersection with a binder and has a density of between about two and about six pounds per cubic foot. The low density, glass fiber board backing 32 provides an inexpensive way of adding thickness to the glass fiber structural panel 30. With the low density, glass fiber board backing 32, the glass fiber structural panel 30 has a thickness from about ⅜ of an inch to about 2 inches. In addition to adding thickness to the glass fiber structural panel 30, the low density, glass fiber board backing 32 enhances the sound absorption properties of the glass fiber structural panel 30 without adversely affecting the tack holding properties of the panel provided by the thin, high density, glass fiber mat laminate 34.

The low density, glass fiber board backing 32 can be applied to the thin, high density, glass fiber mat laminate 34 simultaneously with the formation of the glass fiber mat laminate 34 or in a separate forming step. A thermoplastic adhesive layer 36, such as the pliable, thermoplastic adhesive used to form the thin, high density, glass fiber mat laminate 34, is applied to one of the major surfaces of the thin, high density, glass fiber mat laminate 34 and the low density, glass fiber board backing 32 is placed on the thermoplastic adhesive layer 36. The thin, high density, glass fiber mat laminate 34 and the low density, glass fiber board backing 32 are then formed under heat and pressure to adhesively bond the low density, glass fiber board backing 32 to the back of the thin, high density, glass fiber mat laminate 34 to form the glass fiber structural panel 30 at a temperature sufficient to activate the adhesive but below 400° Fahrenheit.

Figure 3:
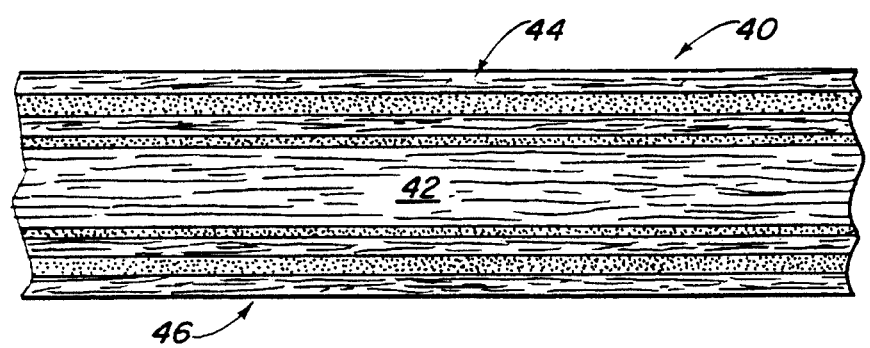
FIG. 3 is a cross sectional view of a third embodiment of the glass fiber structural panel of the present invention which has a low density core interposed between two thin, high density, glass fiber mat laminates.

FIG. 3 shows a third embodiment of the glass fiber structural panel of the present invention. The glass fiber structural panel 40 comprises a low density, glass fiber board core 42 interposed between and adhesively bonded to two thin, high density, glass fiber mat laminates 44 and 46. The thin, high density, glass fiber mat laminates 44 and 46 have the same structure as and are formed in the same way as the thin, high density, glass fiber mat laminate 22 of FIG. 1. The low density, glass fiber board core 42 is made of randomly oriented glass fibers which are bonded together at their points of intersection with a binder and has a density between about 2 and about 6 pounds per cubic foot. The low density, glass fiber board core 42 provides an inexpensive way of adding thickness to the glass fiber structural panel 40. Since the thin, high density, glass fiber mat laminates 44 and 46 form both major surfaces of the glass fiber structural panel 40, the structural panel 40 has superior span strength and both surfaces of the structural panel 40 exhibit good tack holding properties. These features make the glass fiber structural panel 40 ideal for office partition structures where the increased span strength and the tack holding properties of both surfaces can be used to advantage. As with the embodiment of FIG. 2, the low density glass fiber board core 42 enhances the sound absorption properties of the glass fiber structural panel 40.

With the low density, glass fiber board core 42, the glass fiber structural panel 40 varies in thickness from about ½ of an inch to 2 inches or more. The application of the low density, glass fiber board core layer 42 intermediate the two thin, high density, glass fiber mat laminates 44 and 46 can be performed simultaneously with the formation of the thin, high density, glass fiber mat laminates 44 and 46 or can be performed in a second forming step. A pliable, thermoplastic adhesive layer 48, using an adhesive such as the adhesive used in the embodiment of FIG. 1, is applied to one surface of each of the thin, high density glass fiber mat laminates 44 and 46 and the low density, glass fiber board core layer 42 is positioned between the two thin, high density, glass fiber mat laminates 44 and 46. The thin, high density glass fiber mat laminates 44 and 46 and the low density, glass fiber board core layer 42 are then formed under heat and pressure to adhesively bond the low density, glass fiber board layer 42 to the thin, high density, glass fiber mat laminates 44 and 46 at temperatures sufficient to activate the adhesive but below 400° Fahrenheit.

In describing the invention certain embodiments have been used to illustrate the invention and the practices thereof. However, the invention is not limited to these specific embodiments as other embodiments and modifications within the spirit of the invention will readily occur to those skilled in the art on reading this specification. The invention is thus not intended to be limited to the specific embodiments disclosed, but is to be limited only by the claims appended hereto.

We claim:

1. A glass fiber structural panel comprising: layers of glass fiber mat and layers of pliable, thermoplastic adhesive intermediate said layers of glass fiber mat; each of said glass fiber mats comprising fibers having an average diameter between 1 micron and 16 microns; each of said glass fiber mats having a weight between about 1.4 and about 2.8 pounds per one hundred square feet; said layers of thermoplastic adhesive adhesively bonding said layers of glass fiber mat together, but not impregnating said layers of glass fiber mat, to form a planar, thin, high density laminate of said glass fiber mat layers and said thermoplastic adhesive layers, between about 1/16 of an inch and about 3/16 of an inch thick that returns to a planar condition without wrinkles or creases after being folded.

2. The glass fiber structural panel of claim 1, wherein: each of said glass fiber mats comprises randomly oriented glass fibers bonded at their points of intersection by a binder and said thermoplastic adhesive activates at a temperature below a temperature at which the binder will discolor.

3. The glass fiber structural panel of claim 1, wherein: said pliable, thermoplastic adhesive is a thermoplastic film.

4. The glass fiber structural panel of claim 1, wherein: a glass fiber board backing having a density between 2 and 6 pounds per cubic foot is adhesively bonded to one major surface of said planar, thin, high density laminate.

5. The glass fiber structural panel of claim 1, including: a second planar, thin, high density laminate; and a glass fiber board core layer having a density between 2 and 6 pounds per cubic foot intermediate and adhesively bonded to major surfaces of both of said planar, thin, high density laminates.

6. A glass fiber structural panel comprising: layers of glass fiber mat and layers of pliable, thermoplastic adhesive intermediate said layers of glass fiber mat; each of said glass fiber mats comprising randomly oriented fibers bonded together at their points of intersection by a binder and having an average diameter between 13 and 16 microns; each of said glass fiber mats having a weight between about 1.4 and about 2.8 pounds per one hundred square feet; said layers of thermoplastic adhesive adhesively bonding said layers of glass fiber mat together, but not impregnating said layers of glass fiber mat, to form a planar, thin, high density laminate of said glass fiber mat layers and said thermoplastic adhesive layers, between about $1/16$ of an inch and about $3/16$ of an inch thick, that returns to a planar condition without wrinkles or creases after being folded 90° and has planes of relative weakness whereby a portion of one of said layers of glass fiber mat can be separated from said planar, thin, high density laminate.

7. The glass fiber structural panel of claim 6, including: a glass fiber board backing having a density between 2 and 6 pounds per cubic foot adhesively bonded to one major surface of said planar, thin, high density laminate.

8. The glass fiber structural panel of claim 6, including: a second planar, thin, high density laminate; and a glass fiber board core layer having a density between 2 and 6 pounds per cubic foot intermediate and adhesively bonded to both of said planar, thin, high density laminates.

9. The glass fiber structural panel of claim 6, wherein: said planar, thin, high density laminate has a modulus of elasticity of at least 60,000 psi.

10. The glass fiber structural panel of claim 6, wherein: said planar, thin, high density laminate returns to a planar condition without wrinkles or creases after being folded through 180°.

* * * * *